US012103226B2

(12) United States Patent
Kirchner et al.

(10) Patent No.: US 12,103,226 B2
(45) Date of Patent: Oct. 1, 2024

(54) DEVICE FOR TREATING OR INSPECTING A MATERIAL, USE OF THE DEVICE

(71) Applicant: HETEROMERGE GmbH, Dresden (DE)

(72) Inventors: Robert Kirchner, Pirna (DE); Andreas Richter, Dresden (DE); Georgi Paschew, Dresden (DE)

(73) Assignee: HETEROMERGE GMBH, Dresden (DE)

( * ) Notice: Subject to any disclaimer, the term of this patent is extended or adjusted under 35 U.S.C. 154(b) by 112 days.

(21) Appl. No.: 17/617,455

(22) PCT Filed: Jun. 11, 2020

(86) PCT No.: PCT/DE2020/200046
§ 371 (c)(1),
(2) Date: Dec. 8, 2021

(87) PCT Pub. No.: WO2020/249171
PCT Pub. Date: Dec. 17, 2020

(65) Prior Publication Data
US 2022/0219388 A1 Jul. 14, 2022

(30) Foreign Application Priority Data
Jun. 11, 2019 (DE) .......................... 102019115780.3

(51) Int. Cl.
*B29C 64/209* (2017.01)
*B29C 64/135* (2017.01)
(Continued)

(52) U.S. Cl.
CPC .......... *B29C 64/135* (2017.08); *B29C 64/209* (2017.08); *B29C 64/245* (2017.08);
(Continued)

(58) Field of Classification Search
None
See application file for complete search history.

(56) References Cited

U.S. PATENT DOCUMENTS 9,927,702 B2 * 3/2018 Gates ...................... G02B 1/04
2001/0008230 A1 * 7/2001 Keicher .................. B22F 10/73
219/121.84

(Continued)

FOREIGN PATENT DOCUMENTS

DE  102011012412 A1  8/2012
DE  102014221991 A1  1/2015
(Continued)

OTHER PUBLICATIONS

English language machine translation of German Patent Application Publication No. DE 102011012412 A1, published Aug. 30, 2012.

(Continued)

*Primary Examiner* — Timothy Kennedy
(74) *Attorney, Agent, or Firm* — Kolitch Romano Dascenzo Gates LLC

(57) ABSTRACT

The invention relates to a device and its use for multiphoton printing for the additive manufacture of three-dimensional structures or for the inspection of these and other structures of comparable size ratios in the presence of an inspection medium. In order to manufacture and inspect three-dimensional structures that have varying properties and/or material compositions, the device according to the invention is characterized by a locally selective material feed (9), a locally selective material discharge (11) and locally selective, focused emission or reception of electromagnetic radiation.

15 Claims, 3 Drawing Sheets

Figure 1:
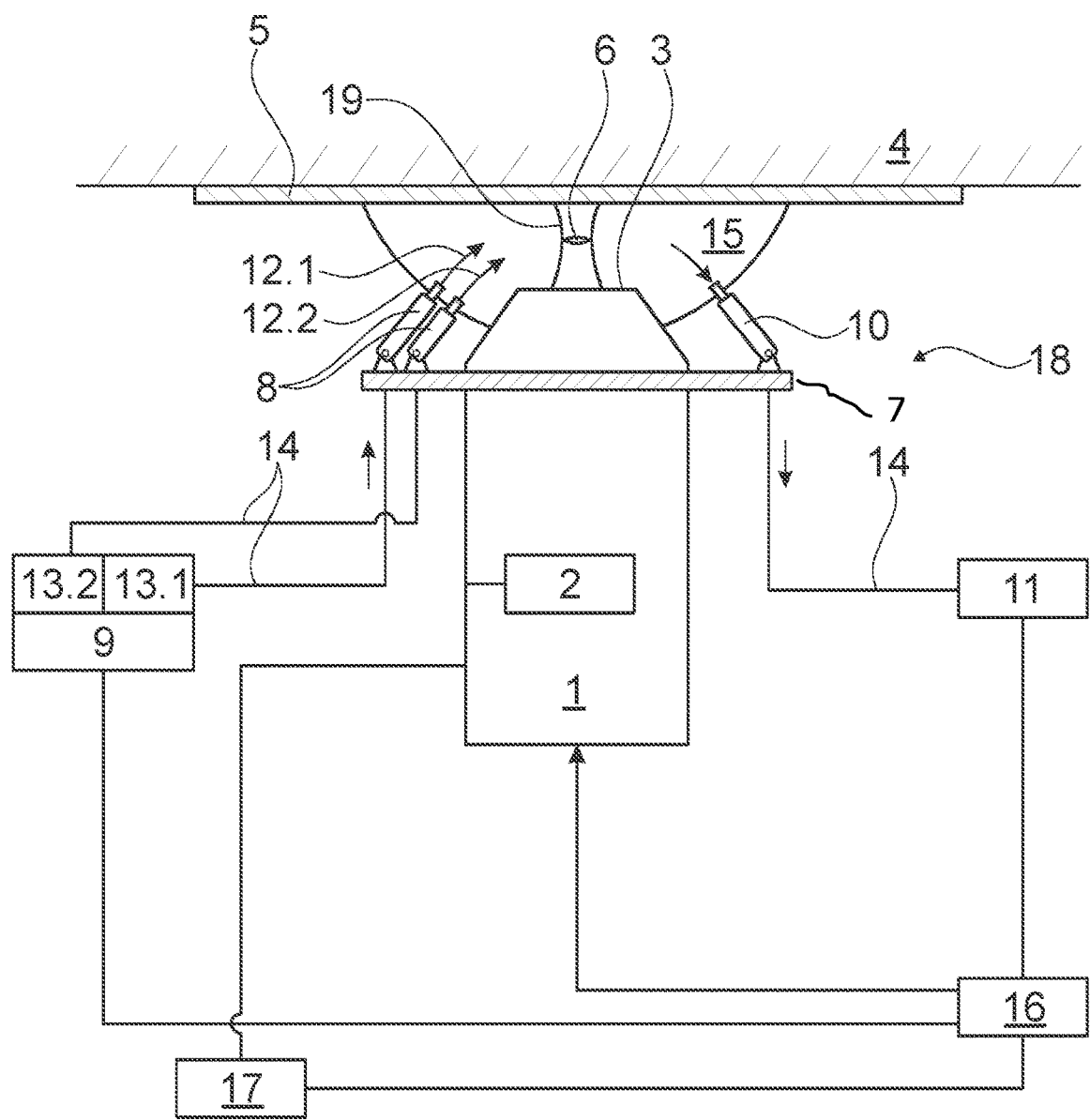

(51) Int. Cl.
*B29C 64/245* (2017.01)
*B29C 64/264* (2017.01)
*B29C 64/336* (2017.01)
B29K 105/24 (2006.01)
B33Y 10/00 (2015.01)
B33Y 30/00 (2015.01)

(52) U.S. Cl.
CPC .......... *B29C 64/264* (2017.08); *B29C 64/336* (2017.08); *B29K 2105/24* (2013.01); *B29K 2995/0094* (2013.01); *B33Y 10/00* (2014.12); *B33Y 30/00* (2014.12)

(56) References Cited

U.S. PATENT DOCUMENTS

| | | | | |
|---|---|---|---|---|
| 2005/0036183 A1* | 2/2005 | Yeo | ............... | G03F 7/70341 |
| | | | | 359/280 |
| 2010/0039628 A1* | 2/2010 | Shiraishi | ............ | G03F 7/70341 |
| | | | | 355/30 |
| 2012/0218535 A1* | 8/2012 | Thiel | ............... | B33Y 30/00 |
| | | | | 355/53 |
| 2015/0212310 A1 | 7/2015 | Fukuda et al. | | |
| 2016/0046070 A1* | 2/2016 | Mappes | ........... | B29D 11/00663 |
| | | | | 264/482 |
| 2018/0015661 A1* | 1/2018 | Xu | ............ | B33Y 30/00 |
| 2018/0281324 A1* | 10/2018 | Gießen | ............... | B33Y 10/00 |
| 2019/0126537 A1 | 5/2019 | Saha et al. | | |
| 2020/0102529 A1 | 4/2020 | Guillemot et al. | | |

FOREIGN PATENT DOCUMENTS

| | | |
|---|---|---|
| DE | 102014110505 A1 | 1/2016 |
| WO | WO 2016/150559 A1 | 9/2016 |
| WO | WO 2018/167402 A1 | 9/2018 |

OTHER PUBLICATIONS

English language machine translation of PCT Patent Application Publication No. WO 2016/150559 A1, published Sep. 29, 2016.

* cited by examiner

DEVICE FOR TREATING OR INSPECTING A MATERIAL, USE OF THE DEVICE

The invention relates in general to devices, and to methods which can be carried out with the devices, for treating or inspecting a material. It relates in particular to devices and their use for multiphoton printing for the additive manufacture of three-dimensional structures or for the inspection of such structures and other structures with comparable size proportions in the presence of an inspection medium.

The devices comprise a material delivery, a material discharge and an optical unit. The optical unit comprises means for emitting or receiving electromagnetic radiation. The optical unit furthermore comprises means for aligning the emitted or received radiation.

The production of one-piece complex 3D structures by means of 3D printing, for example laser sintering of particulate starting material or multiphoton printing, is known. The latter allows a resolution of the substructures in the millimeter to micrometer and submicrometer range. Such a printing method uses photocrosslinkable printing materials which have a liquid to pasty consistency and are placed in a working plane in order to be treated there by means of electromagnetic radiation and solidified by means of a multiphoton polymerization initiated thereby. The solidification is initiated pointwise in the focal point of the electromagnetic radiation of a radiation source, so that a structural element, the smallest unit of the three-dimensional structure, is formed at the focal point, now also to be referred to as the working point. In order to produce the entire structure, the focal point changes step-by-step by following a movement path, generally but not necessarily stepwise, and the structure is thus constructed pointwise.

In order to initiate the polymerization, longwave laser radiation is generated so that the radiation intensity achieved at the place of incidence is sufficient to produce the polymerization in the respective printing material as a result of absorption of two or more photons.

The delivery of the printing materials, the spatial and temporal control of the radiation emissions and further method steps and parameters required for carrying out the method are implemented or provided by means of a control unit designed therefor. The movement paths of the focal point, which are required for the construction of the overall structure, are generally followed by means of a CAD dataset representing the structure, which is stored in the control unit, or by control instructions.

In order to produce 3D structures from different materials using multiphoton printing, it has hitherto been necessary to carry out elaborate sequential process steps. Material A has been printed first. The excess material has subsequently been removed and the structure already printed has been covered with material B. After the currently printed structure has been visually located in material A and the printing process has been set up for material B, it has been possible to print material B. The changing of the material has required extraction of the printed object from the printer, flushing with special chemicals, reinstallation in the printer and accurate positioning of the second printing region in material B with respect to the parts already printed in material A with a very high accuracy. The time expenditure which is needed for such a material change prevents effective production of structures consisting of a plurality of materials, also varying layerwise. It is furthermore necessary to ensure that the structures already constructed withstand the cleaning undamaged. For this purpose, the structures must be inherently stable. Often, the structure is not stable enough until after completion.

Besides the radiation source suitable for the method, for example for illumination (irradiation) over an area, a printing device which may be used for the method comprises a material delivery which provides the necessary liquid and pasty printing materials depending on the extent of the illumination in the required amount and at the required location. A holding device which holds the 3D structure to be produced, including possibly required supporting materials, is furthermore formed. This is generally a platform on which the 3D structure is constructed. By positioning of the radiation source relative to the platform and energy input by means of illumination, the substructures of the 3D structure can be produced successively.

In respect of this method, reference is made for example to DE 10 2011 012 412 A1. In the method described therein, 3D structures with macroscopic and microscopic substructures are produced by using two materials having different photosensitivities. In this case, the different materials are used layerwise. In order to carry out a material change within the structure, the structure is subjected to a cleaning process in a 5-minute ethanol bath in order to remove residues of the printing material previously used.

Because of the very small structure sizes producible with this technology, which may lie in the range of less than one micrometer, the small available space for the construction of the structure constitutes particular challenges. These challenges exist both for the device with its component parts and for the inspection of the structures. In order to achieve the required resolution, objectives with a high magnification and a high numerical aperture are used. These objectives have a working distance of less than 400 to 500 µm.

On the basis of the prior art described above, the invention is concerned with the object of providing a multiphoton printing method and a device usable therefor, with which it is possible to produce 3D structures with varying properties and/or from a plurality of different printing materials. Such variations in the structure are intended to be possible both between the layers and within a layer.

It is furthermore desirable for the variability to include both a change of the printing materials and an alteration of the properties of the same material.

It is furthermore desirable for the known supporting materials to be substitutable with supporting structures that can be integrated better into the printing process and for the stability and geometrical accuracy during the method to be improved.

The 3D structures are also intended to be producible in the micrometer and submicrometer range.

In order to carry out the observation of the structural elements producible with the printing method, it is furthermore desirable to have available an inspection method and an inspection device usable therefor, which assists the printing method with its achievable structural sizes while being variably tailorable to the materials used.

This object is achieved by a device according to the present disclosure.

The essential concept of the invention of the device and of the method which can be carried out therewith will be described insofar as position-selective and separate material delivery of the printing material or the inspection material in the form of portions cooperates with position-selective material discharge and—in the case of printing—position-selective illumination.

The materials that are to be delivered and withdrawn in the printing method are printing materials of which at least one is photocrosslinkable and is position-selectively cured by means of pointwise polymerization.

Furthermore, because of the in-situ material change, it is possible to connect materials which are not compatible but are sufficiently reactive to one another.

The material delivery is preferably carried out portionwise and allows a very wide variety of variations of the material portions available for the method at the working point. This relates in particular to an alteration of their composition. A complete replacement of the material during a method and the provision of additives in order to set the material properties, or auxiliaries which assist the method, are also possible. Depending on the nature and scope of the materials required at the respective portioning point, a material discharge at all portioning points of a three-dimensional structure or of a layer thereof, or only a plurality of deliberately selected portioning points, may take place.

This is separately possible pointwise, since old material, which in particular has entered the vicinity of the current portioning point from the preceding printing or polymerization step and likewise from the preceding inspection step, can likewise be taken away and new material can be added. Because of the position-selectively required small amounts, the printing material may be modified after a short time and replaced, even fully, after only a short waiting time. This applies in particular for substructures to be printed in the micrometer and submicrometer ranges, which require correspondingly small portions for a structural element.

In a similar way, inspection medium may be deliberately delivered and discharged as well as varied for the pointwise, i.e. related to the structural elements, inspection method. A best possible resolution may thus be achieved and the optics and the object may simultaneously be protected against damaging or undesired influences. The delivery of the inspection medium may take place at different times, for example after the production of a substructure, and the inspection may thus be incorporated directly into the printing process. Depending on the materials used, in such a combined printing and inspection method the same or separate deliveries and discharges may be used for the material delivery and material withdrawal for printing and inspection.

Furthermore, one inspection medium may be mixed with a second inspection medium, also with a temporal alteration of the mixing ratio. Furthermore, an auxiliary material may be employed temporarily, for example for flushing or the like, or together with the inspection medium.

The replacement or the modification of the inspection medium may take place at only one point, for example if the geometry, the size and/or the structure there alter with time. In this case the inspection medium can be modified step-by-step, so that the resolution is adjusted to the alteration of the structure. There is also the possibility of carrying out the modification in an automated fashion if the alteration of the structure is detected in an automated fashion, for example when exceeding a predefined lack of sharpness or by means of pattern recognition, and control of the delivery and optionally also of the discharge of inspection medium takes place on the basis of this.

There is furthermore the possibility of linking 3D printing and inspection of the microscopic structures in such a way that the printing material can simultaneously be used as an inspection medium, optionally with the addition of auxiliary media. In this case, the optical unit comprises both means for generating and means for receiving electromagnetic radiation, which may be employed simultaneously or successively.

By using the principle of the variable material provision and/or material composition, the inspection device and the inspection method may also be used independently of a printing method for the inspection of microscopic structures and the printing method may be used with an alternative inspection method.

Features used in order to implement the concept are described below. The person skilled in the art will combine these differently with one another in different embodiments, inasmuch as it seems expedient and suitable to them for an application.

The term "printing material" used for the invention refers both to the crosslinkable materials which are curable and therefore form the structural elements, and also other materials which are intended to be available at the portioning point for the production of the respective structural element.

In respect of material application and illumination, the term "position-selective" refers to dispensing of the printing material and illumination for solidification of the printing material, which is deliberately variable in relation to placement and the extent of which can be restricted to a degree that correlates with the structural elements to be produced as the smallest units of the 3D structure. The variability of the placement includes that a relative movement may be carried out between the relevant material outlet or the radiation output of the emission unit and the 3D structure, or the holding device of the 3D structure. The position-selective dispensing of a printing material also includes that the material portion thereby formed has a greater extent because of mixing of two printing materials than the focal point.

The term "pasty" in relation to the invention means that a material is viscous, pulpy to paste-like, so that the material is capable of flowing, can be transported with application of pressure by means of lines and nozzles of the material delivery and material discharge, and can be dispensed and discharged as a portion. The viscosity of the pasty materials used may lie in the range of from 1 to 500 mPa s, preferably in the range of from 1 to 250 mPa s, more preferably in the range of from 1 to 150 mPa s, more preferably in the range of from 1 to 100 mPa s, depending on the size of the structural elements and the pressures and flow rates usable for the delivery and discharge. Flow rates of the material of less than 1 ml/min may therefore be achieved.

The formation of a material portion takes place on the surface of a substrate, in which case the substrate may be a carrier substrate tailored to the respective method in terms of material and configuration or may be a structure previously produced by the printing method or another preceding method. The latter may be a substructure of a structure to be produced by means of the printing method.

The point on the substrate which is defined by the position-selective and dosable material delivery and the optical alignment and focusing onto the material portion, or the inspection, will be referred to in relation to the device as a working point. In relation to the method in which a portion of the printing and/or inspection material is produced there, it is also referred to here as a portioning point. In relation to the production of the printing portion of an individual structural element of a three-dimensional structure, the "portioning point" constitutes that spatially extended region or "printing point" in which a structural element is printed. It is clear that the size of the actual focal point of the radiation need not coincide with the size of the portioning point.

In analogy with this, the "inspection point" is that point onto which the observation is directed and focused, and which lies inside the portion of the inspection medium.

A device for treating or observing a material according to such a concept comprises a material delivery having at least one material outlet, generally one for each material used. A material used may also be a material composition consisting of a mixture of a plurality of materials, which are already in the form of a mixture before delivery to the working point. This may remain unaltered in the course of the method or be admixed with other materials at the working point.

Preferably, two, three or more material outlets are arranged. The material outlets are configured according to the consistency of the materials in such a way that they allow position-selective, dosable delivery of materials to the working point. The position-selective dispensing includes the respective material outlet being positionable in the vicinity of the working point and the focal point of an optical unit of the device lying within the dispensed printing portion.

The device furthermore comprises a material discharge having at least one material inlet. The at least one material inlet is configured according to the expected consistency of the material at the working point in such a way that position-selective material discharge of the liquid-to-pasty material from the working point can take place. Here again, the position-selective discharge in turn includes the material inlet being positionable in the vicinity of the working point. The position must lie so close to the working point that the material no longer required can be discharged. During the printing method, this is that unsolidified material which surrounds the structural element, and in the inspection method the inspection medium no longer currently required.

At least one material outlet of the material delivery and/or at least one material inlet of the material discharge may be mounted on the radiation output, or on the objective. In this way, the material portion, i.e. the portion of the printing materials or the portion of the inspection medium, may be portioned precisely and/or the material discharge may be made particularly effective, since the material inlet is likewise arranged in the relevant portion or at least in the immediate vicinity thereof. This measure also improves and accelerates the material discharge. As an alternative, at least one material outlet and/or a material inlet may be mounted on the radiation output of the radiation source with the advantages described above, even without the immersion effect.

The respectively desired effect may be achieved for different sizes of the material portion if the at least one material inlet and/or material outlet are mounted on the objective releasably or variably positionably or in both ways. The device may therefore be equipped with different, and a plurality of, material outlets and material inlets and may for example be configured as a printing head which comprises the radiation and material component parts required for printing one type of a structural element or the entire three-dimensional structure.

In order to be able to carry out the described material variations, the material delivery is connected to at least a first reservoir of a first material. Optionally, the material delivery may be connected to a second reservoir of the second material and further reservoirs. In the case of the printing method, the first material is a photocrosslinkable printing material, and in the case of the inspection method it is an inspection medium. The materials may be conveyed from the reservoir to the working point by means of suitable fluidic components.

The device furthermore comprises an optical unit. In a printing device, this is an emission unit, and in an inspection device it is an inspection unit, for example a microscope or a camera. Both units may also be combined with one another in an optical unit.

An emission unit comprises at least one radiation source which is configured to generate electromagnetic radiation that provides the required radiation intensity at the focal point. Currently, laser sources in particular are suitable. With the progressive development of radiation sources, however, other radiation sources may also be available.

The optical unit comprises means for alignment and focusing of the generated radiation onto a portioning point, or of the incident (received) radiation from the inspection point onto the inspection unit. Such means suitable for forwarding, deflecting, filtering and focusing the radiation are optical components, for example mirrors, lenses, collimators, light guides and the like. These will be referred to here for brevity as an object for both device variants.

According to one configuration of the device, the objective of the optical unit can be positioned at a distance from the portioning point such that the radiation output or radiation input lies inside the material portion which can be produced by means of the material delivery at the working point. Such a configuration entails requirements in respect of the size of the radiation output and leads to the surface of the objective facing toward the working point being in physical contact with a material portion at the instant of emission. In this way, interfaces that reduce the radiation are avoided. Furthermore, the material delivery and the material discharge are brought very close to the focal point of the radiation source. Very short dead times and a rapid material change are thereby possible.

As a result of this embodiment of the device as an immersion device, the installation space between the radiation output or radiation input and the working point may be increased as much as is allowed by a limitedly producible portion of a printing material, optionally with added inspection medium. Furthermore the freedom of the materials and geometries which may be used is substantially improved. It is possible to print on materials and/or geometries of substrates, carrier substrates or already produced structures such as allowed by wetting with the printing material. If the device is configured with three-dimensional movement and angular adjustment of the working platform by a suitable positioning device, the printing may also take place on freeform surfaces, for example on optical fiber waveguides.

According to a configuration of the device, that surface of the objective which comes into physical contact with one of the liquid or pasty materials delivered during or as a result of the delivery may comprise auxiliary means for positioning the material between the objective and the substrate. The surface wetted by the printing and/or inspection material is generally the lower side of the objective. The positioning means are used for deliberate delivery of the materials into the intermediate space, which may be very small depending on the structure to be produced or inspected. Such positioning aids may be channels, open or partially closed, or other indentations or cavities, the location or direction of which as well as the size of which are adjusted to the material portion respectively to be produced and its position.

Such channels, indentations, cavities or the like may for example be formed in an adapter, for example in the form of a plate, which can be fitted onto the objective and is itself part of the positioning means.

The configuration of such an adapter may vary according to different requirements, for example the properties of the material being delivered, the shape and the dimensions of the volumes needed, the requirements due to the objective, the desired portion size and the like. If a channel or otherwise shaped positioning means is closed, this applies only to regions away from the working point. In the region of the working point itself, its fluidic system is open.

Clearly, the positioning means are configured and arranged in such a way that contact thereof with the carrier substrate is avoided at least in the region of the working point during the use of the device, in order to avoid damage to the substrate or the object. A positioning means merely assists the material flow.

Surface treatments or surface coatings are also suitable, for example in that they improve the wetting. On the other hand, these positioning aids may likewise assist the material discharge or prevent undesired spreading of the material portion. If material portions in the micrometer and nanometer ranges are to be produced, the type, location and dimensioning of such microfluidic means are correspondingly adjusted. The positioning aids for the delivery and discharge of the material are furthermore suitable for reducing the use of material by the material being guided deliberately to the location of use.

Because of the microstructures and submicrostructures which can also be produced with the device, according to one configuration of the device the material delivery and the material discharge can comprise microfluidic components, for example nozzles, channels, valves, wall structures, pumps and the like. Microfluidics is a particular technical field of fluidics and deals with the behavior, the precise control and manipulation of liquids in a very narrow space and very small volumes, typically in the submillimeter range. In this size range, other physical laws than in macrofluidics come into play. The smaller the dimensions, the greater is the ratio of surface to volume. Capillary forces and surface charges dominate over gravity and allow different liquid drives. Furthermore, small channels allow nonturbulent flows. Because of these advantages, the microfluidic components assist the dosed material delivery and transport of material residues away. These effects may be used in the same way for the delivery and discharge both of printing materials and of immersion media.

The described configurations of the device may be adapted as complex component parts to an existing device, in particular as a printing head to a printing device or as an inspection head to an inspection device, with which comparable material quantities are processed, although there are no restrictions in relation to the known printing or inspection process.

Such a device which comprises the respectively described head unit additionally comprises a holding device which is configured to hold the three-dimensional structure in the course of its production and/or its inspection. Such a holding device is generally a working platform, which may optionally have a lateral boundary.

A positioning device of the device is configured to position the optical unit, the material outlets, the material inlets and the holding device relative to one another. Which of the component parts are moved in this case depends on the various conditions such as the structure to be produced or inspected, the configuration of the material delivery and material discharge, the materials used, and the like. It is consequently necessary to reposition the working point as well as the locations of the material delivery and material discharge step-by-step with the desired precision and step length relative to the structure. To this end, the positioning device grips onto the component parts respectively to be moved, which have the movement freedoms possible for this. If the material outlet or material outlets and the material inlet or material inlets are connected to the radiation source or the objective in such a way that they are part of a head unit, the head unit and the holding device are positioned relative to one another.

The temporally and spatially exact positioning, the control of the emission unit, including its radiation source, or the inspection unit, as well as the control of the material delivery and the material discharge are carried out by means of a control unit. For this purpose, the control unit is communicatively connected to the relevant component parts of the device.

In summary, it may be stated that the devices are designed in such a way that even very small material volumes can be processed. In this way, the replacement times for the materials can be kept extremely short. The same design structure makes it possible to vary the concentration of materials dynamically during their processing or use. In this case, the device may also be readily adapted to a very wide variety of systems.

The device described above may be used with the corresponding embodiment for different methods. According to a first use of a device configured for multiphoton printing, three-dimensional structures are produced by generating a material portion on a suitable substrate and initiating its polymerization by means of electromagnetic radiation. By repeating the generation of such a structural element many times in the desired relative position with respect to one another, the three-dimensional structure is formed.

In order to carry out the printing method, printing material, at least the first of which is photocrosslinkable, is provided and a portion thereof is respectively delivered to the desired location, i.e. position-selectively. The electromagnetic radiation of the radiation source is focused onto the printing portion formed in this way.

According to the invention, at least one printing material, preferably two or more printing materials, is/are used to form a printing portion. Because of the photocrosslinkability of the at least one, i.e. of the first, printing material, after completion of the respective printing portion it is illuminated position-selectively by means of the emission unit during a radiation interval and consequently solidified to such an extent that a structural element is formed.

Such a material delivery also includes the use of two or more photocrosslinkable materials in a printing portion. As an alternative or in addition, a printing material may be a further photocrosslinkable printing material which has a photosensitivity differing from the first printing material.

As an alternative, the second printing material may be a substance which influences the physical properties, for example the optical, electrical, magnetic or mechanical properties, or the chemical properties, for example the compatibility in relation to other substances. Such substances are for example fillers or dopants or other suitable additives. The use of photoactivatable printing materials, which alter their binding properties under illumination or are available as new printing materials by photodecomposition, offers further variation possibilities in the printing portion.

The delivery of auxiliary media such as flushing agents, solvents, adhesion promoters or the like is also possible and is intended to be included in the term printing material. For example, a solvent which washes away uncrosslinked material may be delivered before new or different material is introduced. In this way, even immiscible materials may be combined with one another. Flushing with an auxiliary material which improves the adhesion of the printing material being built up in an intermediate step is likewise possible.

After the end of the illumination at the respective portioning point, unsolidified material of the printing portion which remains there is discharged in a suitable way, for example by means of suction. In this way, a desired different printing material or a desired different material composition of the printing portion may be delivered at the neighboring next portioning point.

By the remaining old material simultaneously being discharged and new material being delivered to the neighboring next portioning point, according to one configuration of the method, the waiting time between the radiation intervals may be shortened further. Furthermore, the simultaneous material delivery and material discharge allows that the material quantity of the respective printing material can be varied fluidly by means of the ratio between material delivery and material discharge. Continuous material delivery is also possible.

The method steps of material delivery, illumination of the printing portion and material discharge are repeated many times at further portioning points, and the three-dimensional structure is thus constructed successively. The sequence of the spatial location of the portioning points is in this case specified by a suitable control unit, for example by a CAD dataset, and the described method step is carried out with the respectively desired material composition at each portioning point.

The respectively required material composition may be achieved by one or more of the following alterations from the respectively preceding composition:

Use of a first printing material which differs from the previous one;

Use of one or more further printing materials which are photocrosslinkable;

Use of one or more further printing materials which are not photocrosslinkable;

Alteration of the proportions (percentage by volume or weight) of one or more printing materials entering into the structural element in the mixture of the printing portion, in which case the total amount of the mixture of the printing portion may be maintained or altered;

Addition of a further photocrosslinkable printing material while altering or maintaining the proportion (percentage by volume or weight) of the second printing material with respect to the total amount of the mixture of the printing portion.

Further variants for the composition of the printing portions are possible. It is advantageous, for example, that properties such as optical refractive index, magnetization strength, coloration, fluorescence, shrinking or swelling behavior, etc., may be varied without material replacement but merely by dynamic variation of the concentration of fillers within the material composition. Gradients, i.e. a uniform or almost uniform, or stepwise alteration of a property may also be produced in the structure.

If the alteration of the material composition also requires an alteration of the radiation parameters, this is clearly adapted at the relevant portioning point.

According to the above-explained different usability of the printing materials delivered at the respective portioning point, it is clear that in particular the method steps of material delivery, material discharge and illumination may be carried out in a different order. Intermediate steps, in which for example no illumination takes place, as in the case of position-selective flushing or the like, are also possible.

It is found to be advantageous in the pointwise construction of the three-dimensional structure by using the described printing materials and by means of position-selective material delivery, position-selective material discharge and position-selective illumination for the printing object not to be dried prematurely during its production so that a structural collapse due to capillary forces can be avoided. The high structural integrity in each intermediate step furthermore allows that elements consisting of a new material can be incorporated into the existing matrix consisting of a first material, if said matrix is sufficiently open-pored to receive the printing materials to be introduced. If the matrix consists of a photosensitive material, the new material may have a different photosensitivity. The existing matrix is in such a case transparent to the radiation for crosslinking the new material, so that its crosslinking can also take place inside the existing matrix.

The described material delivery, material discharge and illumination allow configuration of the method as an immersion method, in which the radiation output of the emission unit is in physical contact with the printing portion during the illumination. An immersion method is characterized in that at least that surface of the objective through which the radiation enters or emerges is immersed in a liquid or pasty immersion medium to such an extent that the latter fills the space between the objective and the focal point. Because of the higher value of the refractive index of the immersion medium relative to air, it is possible to achieve a higher numerical aperture and a higher resolution of the objective of the emission unit. For this purpose, the radiation output of the emission unit is immersed in the liquid or pasty printing portion, which thus serves as an immersion medium, to such an extent that the surface of the optics facing toward the printing portion is brought in physical contact with the material portion, i.e. it is covered by the material of the printing portion.

According to one configuration of the method, the three-dimensional structure is constructed layerwise, a layer being constructed from a multiplicity of structural elements. Because of the above-described cooperation of position-selective material delivery and position-selective material discharge, an alteration of the composition of printing portions may take place both within a layer and from layer to layer. Three-dimensional structures having a locally freely selectable material composition may therefore be achieved.

In terms of the method, it is likewise possible for at least one group of structural elements, i.e. a connected region within the three-dimensional structure, to be formed by using and printing at least one monomer as a first printing material and a crosslinker as a second printing material, optionally with a variation of the concentration of the crosslinker. Such a region may function as a sacrificial layer, for example as a supporting or filling region, which may later be eliminated.

The three-dimensional structure which can be produced with the described method in the aforementioned configurations has a variation in the material composition and/or in the material property within the structure, which may—considered theoretically—extend arbitrarily in a horizontal direction, corresponding to the coordinate system of the X-Y plane conventionally used in three-dimensional space, and/or in the direction perpendicular thereto, the Z direction, i.e. within the structure. A variation of one or more material properties within the three-dimensional structure in the form of gradients is also possible.

The minimal waiting times during the material discharge make it possible to change the material and at the same time, particularly in the variant of the immersion method, to produce periodic substructures with a very high position resolution of less than 500 nm, preferably less than 300 nm, more preferably less than 200 nm, even less than 100 nm. Substructures in the submicrometer range, which consist of different materials, may be printed. The repetitive nature of these substructures is assisted by a continual change of the printing material. In addition, gradient structures may be formed. In these, for example, a particular filler may be varied as dynamically and continuously as possible.

With the method according to the invention, because of the variability in terms of the printing as well as the combinable materials, different components may be produced. For example, it is possible to print lens stacks which consist of a plurality of optically different materials, or lenses whose refractive index varies within the lens. The method may also be used to print mechanically active structures, for example micromechanical components, the component parts of which may also consist of different materials.

The described principle of the printing method by means of position-selective material delivery and material discharge with focused illumination may also be applied to the inspection method. In the latter, a suitable inspection medium is portioned by means of a material delivery at the working point, which in this case is the inspection point. The portioning is carried out to the extent that the surface of the objective facing toward the object is in physical contact with the inspection medium, which in this embodiment is referred to as the immersion medium, i.e. because of the focusing of the objective onto the desired inspection point and the associated setting of the distance between the objective and the inspection point it is immersed in the immersion medium, as described above with respect to the immersion printing method. In order to replace the immersion medium or after the end of the inspection, the immersion medium may be removed by means of a position-selective material discharge.

Here as well, good adjustment of the properties of the immersion medium to the requirements of the inspection is possible because of the variation of the materials used, as described above with respect to the printing method. A combination of the two methods may also take place if the emission unit is temporarily substituted with an inspection unit and a portion of an immersion medium tailored to the objective of the inspection unit delivered instead of or in addition to the printing portion. It is also possible for the printing materials to be compatible per se with the immersion objective.

The use of a known immersion medium, for example an immersion oil, is also possible. The focusing may take place through a transparent substrate into the optionally changeable immersion medium.

Figure 2:
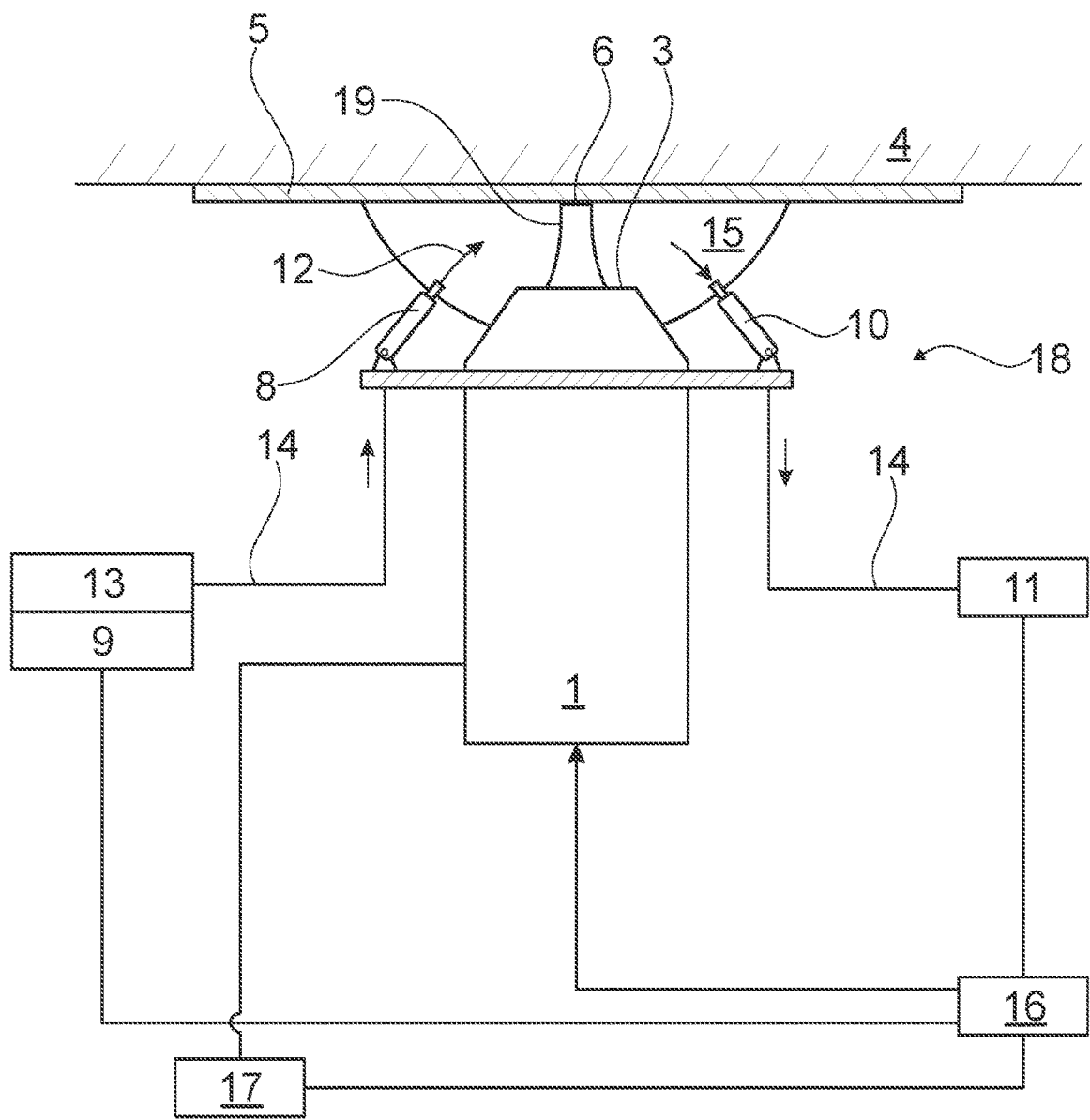
Figure 3:
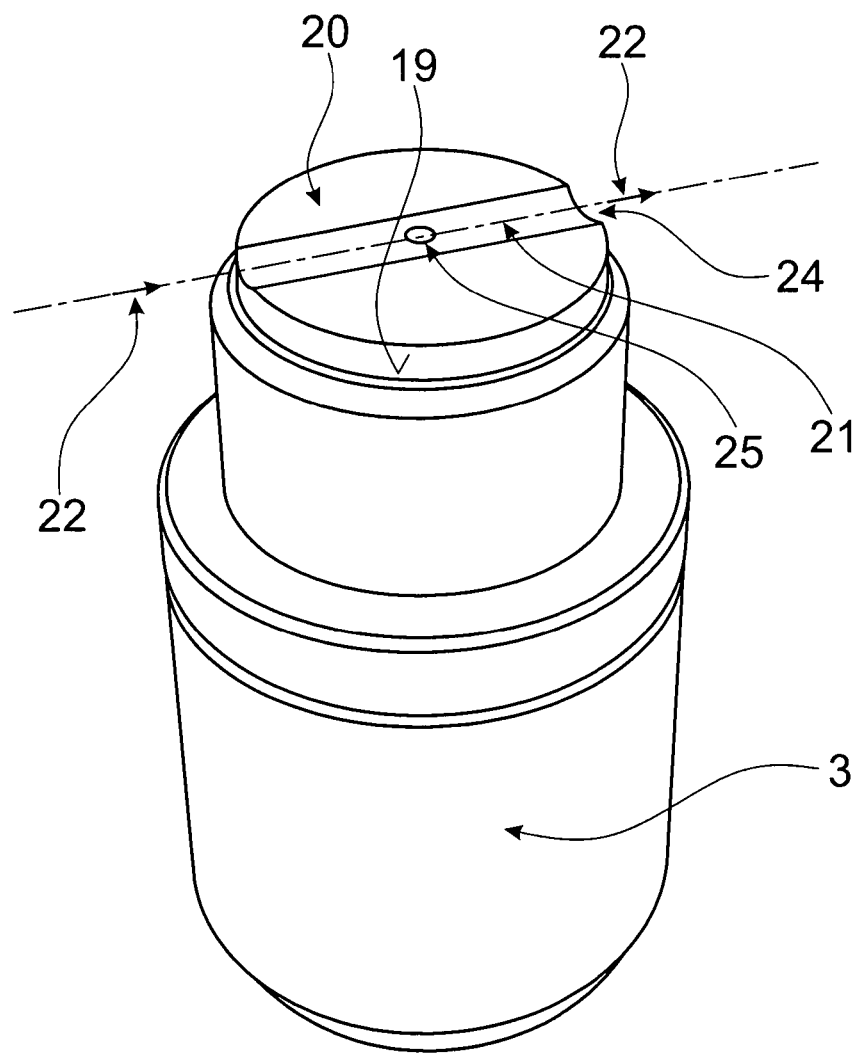

The above-described temporal variance of the inspection medium may also be applied for the immersion method, so that the optimal representation of a structure which alters over time may take place. The invention will be explained in more detail below with the aid of configurations of the device. For this purpose, FIG. 1 shows a printing device having a printing head, FIG. 2 shows an inspection device having an inspection head; and FIG. 3 shows an objective which comprises one embodiment of positioning aids for the material.

The figures show the devices only schematically in outline, as is required for explanation of the invention. They make no claim to completeness or accuracy of scale.

The printing device according to FIG. 1 comprises an emission unit 1 having a radiation source 2 and a radiation output 3. A laser is used as a radiation source. The radiation output 3 lies opposite a working platform 4 on which a carrier substrate 5 for receiving the three-dimensional structure (not represented) is arranged. The focal point of the emission unit 6, which at the same time is also the working and portioning point, lies between the radiation output 3 on the carrier substrate 5 or the three-dimensional structure with its progressive construction.

Two material outlets 8 of a material delivery 9 and a material inlet 10 of a material discharge 11 are mounted at the radiation output 3 of the radiation source 2 by way of suitable holding means 7. Material outlets 8 and material inlet 10 are configured as microfluidic nozzles. They carry out the delivery of the first printing material 12.1 and of the second printing material 12.2. The holding means 7 allow mounting and dismounting of the nozzles as well as the mounting of further nozzles for further printing materials and/or a further material inlet 10. The two printing materials 12.1, 12.2 are respectively stored in a reservoir 13.1, 13.2 and connected to the nozzles by means of microfluidic channels 14.

The effect of the configuration of the emission unit 1 with radiation source 2 and the mounting of the material outlets 8 and of the material inlet 10 at the radiation output 3 is that these component parts together form a printing head 18 which may be employed on existing printing systems.

The dispensing of the two printing materials 12.1, 12.2 onto the carrier substrate 5 leads to the mixing and the formation of a printing portion 15. The printing portion 15 has a size and is positioned in such a way that the radiation output 3 of the radiation source 2 is in physical contact with the printing portion 15, and in the exemplary embodiment lies inside the printing portion 15.

A control unit 16 of the printing device controls the emission unit 1, the material delivery 9 and the material discharge 11, as well as a positioning device 17. The latter carries out the movements of the radiation source relative to the working platform 4 by moving the emission unit 1.

In order to carry out the method, the printing head 18 is positioned opposite the carrier substrate 4 and in this position a printing portion 15 is dispensed onto the carrier substrate 5. Polymerization is initiated in the printing portion 15 by means of a focused laser beam 19, and as a result of this a structural element (not represented) is formed. The printing head 18 is subsequently moved into a neighboring position and a second structural element, which may be connected to the first or is connected in subsequent steps, is formed. This process is initially carried out repeatedly in order to form a first layer of the three-dimensional structure, and each further layer of the three-dimensional structure is subsequently produced in the same way.

The inspection device according to FIG. 2 has a comparable structure. In this case, the emission unit is substituted with an observation unit 1, the radiation output is substituted with an objective 3 of the observation unit 1, at least one printing material is substituted with an immersion medium 12 which is stored in a reservoir 13, the printing portion is substituted with a portion 15 of the immersion medium and the printing head unit is substituted with an immersion head unit 18. The inspection point 6 of an inspection device, in contrast to the focal point of the printing device, lies on the surface of the three-dimensional structure 5. Instead of the printing portion, for the inspection method a portion of the immersion medium 12 is generated on the carrier substrate so that the immersion medium 12 fills the intermediate space between the objective 3 and the carrier substrate 5. In other regards, reference is made to the explanations relating to FIG. 1.

FIG. 3 shows an objective 3 with a view of its lower side 19, which during use faces toward the carrier substrate (not represented). An adapter plate 20, which comprises a central optical window 25 in the form of a round opening, is arranged on the lower side 19. The optical window 25 lies in the middle of a microfluidic, for example fully open, channel 21 which extends centrally over the adapter plate 20 and functions as a positioning aid. The width of the channel 21 in the exemplary embodiment represented is greater than the diameter of the optical window 25. As an alternative, it is possible for the optical window to be larger than the channel is wide, entire filling of the optical window not being necessary.

The feeding of the material to the optical window takes place at one end of the channel 21, referred to as the inflow 23 in order to distinguish it, by means of the material delivery (not represented) by introducing the material into the channel 21. A portion of a liquid or pasty material (not represented) flows into the channel 21 in a flow direction 22 and, because of a predefined sufficient portion size, fills the optical window 25 at least to an extent such that the material is in physical contact with the carrier substrate. After the conclusion of the respective method step, the material is suctioned out from the channel 21 by means of a material discharge (not represented) at the other end of the channel 21, referred to as the outflow 24, and may subsequently be substituted with another material.

Such an adapter plate 20 may be used both for a printing device (not represented) and for an inspection device (not represented). Correspondingly, the material may be a printing material or an immersion material. During use, the adapter plate 20 lies opposite the carrier substrate (not represented) and the material portion has a size and is guided by means of the channel 21 into a position, such that the intermediate space between the carrier substrate 5 and the objective 3 in the region of the optical window 25 is entirely filled.

LIST OF REFERENCES 1 emission unit; observation unit
2 radiation source
3 radiation output, objective
4 working platform
5 three-dimensional structure
6 focal point, portioning point, inspection point
7 holding means
8 material outlet
9 material delivery
10 material inlet
11 material discharge
12, 12.1, 12.2 printing materials, inspection medium
13, 13.1, 13.2 reservoir
14 channels
15 printing portion, portion of the inspection medium
16 control unit
17 positioning device
18 printing head unit, immersion head unit
19 lower side
20 adapter plate
21 channel
22 flow direction
23 inflow
24 outflow
25 optical window

The invention claimed is:

1. A device for multi-photon printing of a printed material comprising:
a material delivery, having at least a first material outlet and a second material outlet, respectively configured for position-selective, dosable individual delivery of at least a first liquid or pasty material and a second liquid or pasty material to a working point of the device in order to form a printed material portion on a substrate, wherein the material delivery is connected to a first reservoir of the first liquid or pasty material and to a second reservoir of the second liquid or pasty material, wherein at least one of the first reservoir and the second reservoir comprises a photocrosslinkable printing material;
a material discharge having at least one material inlet, configured for the position-selective discharge of the first liquid or pasty material from the working point; and
an optical unit comprising an objective configured to generate or receive electromagnetic radiation, to emit the electromagnetic radiation, and to align and focus the electromagnetic radiation onto the working point for the purpose of multi-photon printing of the printed material thereon.

2. The device of claim 1, wherein the objective is configured to be positionable at a distance from the working point such that a radiation output of the objective, from which the electromagnetic radiation is emitted, is able to be in physical contact with the printed material portion.

3. The device of claim 1, wherein a lower side of the objective facing the working point comprises a positioning aid for positioning the first liquid or pasty material between the objective and the substrate.

4. The device of claim 1, wherein the material delivery and the material discharge comprise microfluidic components.

5. The device of claim 1, further comprising:
a holding device configured to hold the substrate and the objective relative to one another;
a positioning device configured to position the objective, the first material outlet, and the holding device relative to one another; and
a control unit configured to control and communicatively connected to the optical unit, the material delivery, the material discharge, and the positioning device.

6. A method of using the device of claim 1, wherein the optical unit is configured for position-selective, focused irradiation of the photocrosslinkable printing material in the course of a succession of radiation intervals, the method comprising:
supplying at least a first printing material that is photocrosslinkable;
delivering, by the material delivery, at least a portion of the first printing material to the working point;
concurrently with the delivering, generating a printing portion comprising at least the portion of the first printing material at the working point;
irradiating, with the optical unit, the printing portion during a radiation interval, in such a way that multiphoton processes are induced in the printing portion and a structural element, which comprises at least the portion of the first printing material, is formed as a result thereof;

discharging parts of the portion of the first printing material from the working point; and repeating the delivering, the generating, and the irradiating to generate a three-dimensional structure comprising a multiplicity of structural elements.

7. The method of claim 6, further comprising:

delivering a second printing material to the working point, wherein the second printing material is different from the first printing material.

8. The method of claim 6, wherein the optical unit comprises a radiation output facing the working point, the method further comprising:

bringing the radiation output into physical contact with the printed material portion during the irradiating.

9. The method of claim 6, wherein the printing portion is formed within a matrix which consists of an open-pored material and transparent to wavelengths used for the irradiating.

10. The method of claim 6, wherein the delivering and the discharging take place simultaneously.

11. The method of claim 6, wherein the three-dimensional structure is constructed from substructures with a periodic repetition of the substructures, and wherein a size of a given substructure of the substructures is less than 500 nm.

12. A method of using the device of claim 1 to inspect an object at the working point, the method comprising:

supplying at least a first immersion medium;

delivering, by the material delivery, a portion of the first immersion medium to the working point;

setting of a distance between the objective and the working point in such a way that a surface of the objective is in physical contact with the first immersion medium;

focusing the optical unit onto the working point; and discharging at least parts of the first immersion medium.

13. The method of claim 12, further comprising at least partially substituting the first immersion medium with a second immersion medium.

14. The method of claim 13, wherein the at least partially substituting the first immersion medium is carried out with the aid of an alteration of the object, which is determined during the method.

15. The device of claim 1, wherein the device is configured for observing the material printed at the working point; and wherein one of the first reservoir or the second reservoir comprises a liquid or pasty immersion medium;

wherein one of the first material outlet or the second material outlet is configured for location-selective, metered supply of the liquid or pasty immersion medium to the working point to form an immersion medium portion of the liquid or pasty immersion medium at the working point such that the liquid or pasty immersion medium is in direct contact with the printed material.

* * * * *